(12) United States Patent
Singh et al.

(10) Patent No.: US 9,100,298 B2
(45) Date of Patent: Aug. 4, 2015

(54) HOST VISIBILITY AS A NETWORK SERVICE

(75) Inventors: Sumeet Singh, Saratoga, CA (US); Sanjay Thyamagundalu, Sunnyvale, CA (US); Sanjay Kumar Hooda, Sunnyvale, CA (US); Muninder Singh Sambi, Fremont, CA (US); Ashok Ganesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1018 days.

(21) Appl. No.: 13/113,315

(22) Filed: May 23, 2011

(65) Prior Publication Data

US 2012/0303790 A1  Nov. 29, 2012

(51) Int. Cl.
*H04L 12/26* (2006.01)
*H04L 12/24* (2006.01)
*G06F 9/50* (2006.01)

(52) U.S. Cl.
CPC .......... *H04L 43/0811* (2013.01); *G06F 9/5072* (2013.01); *H04L 41/12* (2013.01); *H04L 41/24* (2013.01); *H04L 43/04* (2013.01); *Y02B 60/43* (2013.01)

(58) Field of Classification Search
CPC ............ H04L 41/0803; H04L 41/0806; H04L 41/0809; H04L 41/0813; H04L 41/0816; H04L 41/12; H04L 41/24; H04L 43/0805; H04L 43/0811; H04L 43/0817; H04L 43/00; H04L 43/02; H04L 43/04; H04L 43/045; H04L 41/00; H04L 41/022; H04L 41/0246; H04L 41/04; H04L 45/05; H04L 45/028

USPC .......................................... 709/220–222, 226
See application file for complete search history.

(56) References Cited

U.S. PATENT DOCUMENTS

| | | | |
|---|---|---|---|
| 6,795,846 B1 * | 9/2004 | Merriam ....................... | 709/220 |
| 7,243,147 B2 * | 7/2007 | Hodges et al. ................ | 709/224 |
| 7,457,835 B2 | 11/2008 | Toebes et al. | |
| 7,457,870 B1 * | 11/2008 | Lownsbrough et al. ...... | 709/224 |
| 7,543,020 B2 | 6/2009 | Walker et al. | |
| 7,634,566 B2 | 12/2009 | Turner et al. | |
| 7,747,720 B2 | 6/2010 | Toebes et al. | |
| 7,752,311 B2 | 7/2010 | Walker et al. | |
| 7,864,700 B2 * | 1/2011 | Shepard et al. ............... | 709/222 |
| 8,341,254 B2 * | 12/2012 | Devarakonda et al. ....... | 709/223 |
| 8,375,130 B2 * | 2/2013 | Eberlein et al. ............... | 709/226 |
| 2005/0114474 A1 * | 5/2005 | Anderson et al. ............. | 709/220 |
| 2005/0157654 A1 * | 7/2005 | Farrell et al. .................. | 709/224 |
| 2005/0283645 A1 | 12/2005 | Turner et al. | |
| 2006/0179106 A1 | 8/2006 | Turner et al. | |
| 2007/0101000 A1 * | 5/2007 | Childress et al. ............. | 709/226 |
| 2009/0287825 A1 | 11/2009 | Walker et al. | |
| 2010/0049838 A1 * | 2/2010 | DeHaan ........................ | 709/221 |
| 2010/0106742 A1 * | 4/2010 | Guruswamy ................. | 707/773 |

(Continued)

*Primary Examiner* — Patrice Winder
(74) *Attorney, Agent, or Firm* — Edell, Shapiro & Finnan, LLC

(57) ABSTRACT

At a data switching device in a data center, it is detected whether a host has connected to a cloud computing network of which the data switching device and the data center are components. The detection is performed without directly communicating with the host. The data switching device determines properties of the host and generates a message comprising data representative of the properties of the host. The message is sent from the data switching device to a node in the cloud computing network that is configured to manage components of the cloud computing network associated with the host.

20 Claims, 7 Drawing Sheets

(56) References Cited

U.S. PATENT DOCUMENTS

| | | |
|---|---|---|
| 2010/0250668 A1 | 9/2010 | Toebes et al. |
| 2011/0289119 A1* | 11/2011 | Hu et al. ............... 707/803 |
| 2013/0016628 A1* | 1/2013 | Bertani et al. ............ 370/255 |
| 2013/0170490 A1* | 7/2013 | Kreeger et al. ........... 370/390 |

* cited by examiner

HOST VISIBILITY AS A NETWORK SERVICE

TECHNICAL FIELD

The present disclosure relates to cloud computing.

BACKGROUND

"Cloud computing" can be defined as Internet-based computing in which shared resources, software and information are provided to client or user computers or other devices on-demand from a pool of resources that are communicatively available via the Internet, or other electronic network. Cloud computing is envisioned as a way to democratize access to resources and services, letting users efficiently purchase as many resources as they need and/or can afford.

In some possible implementations, cloud computing comprises dynamically linking backend resources (e.g., memory, processors, etc.) to provide web-based services, applications, and data storage on-demand via a cloud computing network. This approach has the potential effect of providing services at lower cost than current options, and with less complexity, greater scalability, and wider reach. However, keeping track of the potentially thousands of compute and associated devices (switches, firewalls, etc.) as services are brought up and torn down on those compute devices can be daunting. Indeed, network management of cloud computing systems currently rely on orchestration tools that learn about cloud elements within a given Data Center, make all placement decisions for all cloud elements within the Data Center, and render and provision the cloud service request by communicating directly with each cloud element in the Data Center. Keeping track of such a dynamic environment is a significant challenge, especially as demand for cloud computing services continues to increase.

DESCRIPTION OF EXAMPLE EMBODIMENTS

Overview

Techniques are disclosed herein to provide host visibility as a network service in a cloud computing network environment. In one embodiment, at a data switching device, e.g., an Access Switch, in a Data Center, it is detected whether a host has connected to a cloud computing network of which the data switching device and Data Center are components. The detection is performed without directly querying the host. At the data switching device, properties of the host are determined and a message is generated comprising data representative of the properties of the host. The message is sent from the data switching device to a node in the cloud computing network that is configured to manage components of the cloud computing network. In so doing, a new connection of a computing device to, or a disconnection of the computing device from a cloud computing network, is detected without communicating directly with the computing device. As a result, network operators can gain insight into precisely whether, which, and how devices (compute, storage, etc.) are being utilized in the cloud computing network and take appropriate, automated, action.

Example Embodiments

Figure 1:
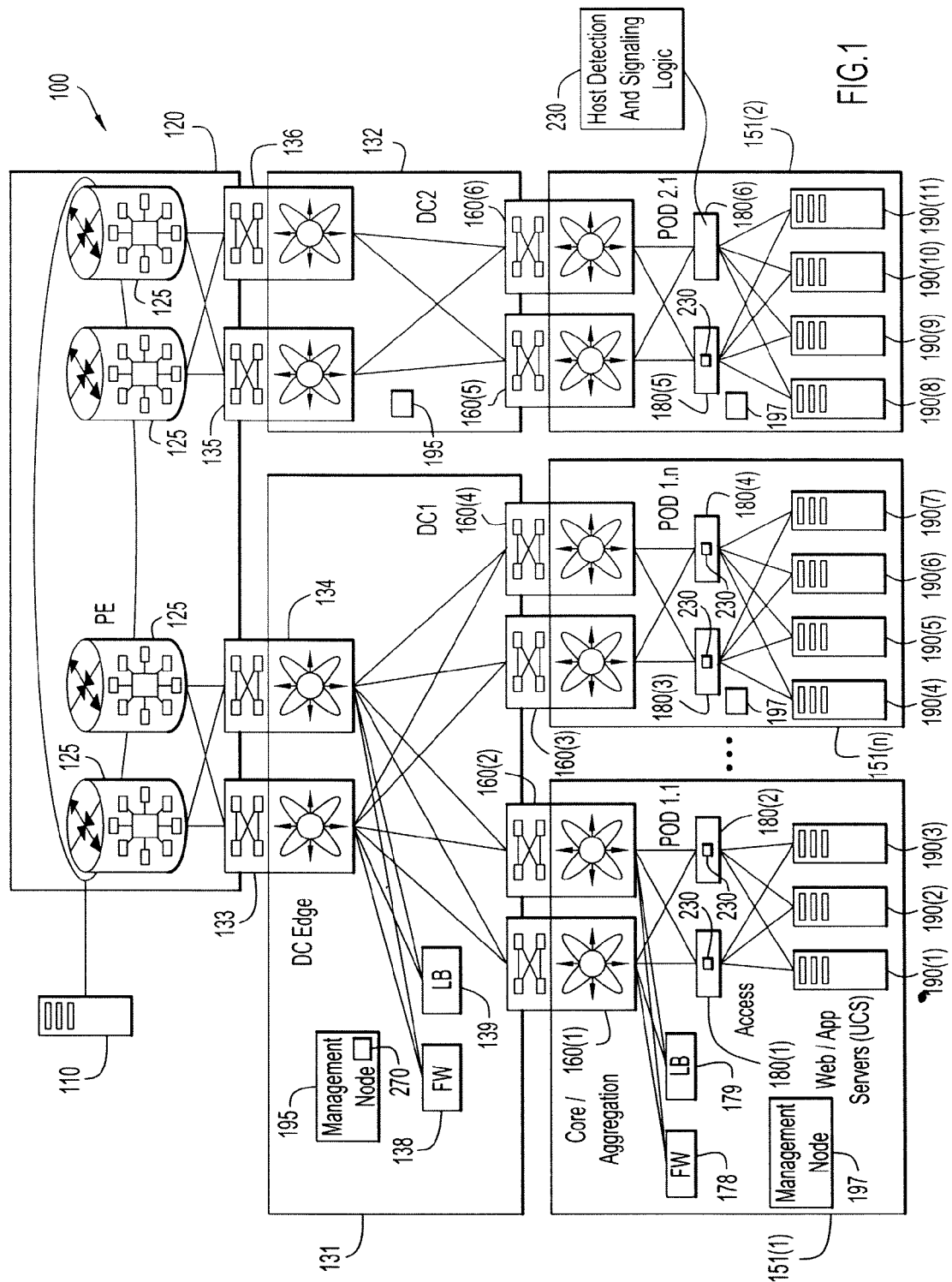
FIG. 1 depicts a block diagram of a network topology that supports cloud computing and that includes Access Switches that enable Host Detection and Signaling Logic.

FIG. 1 depicts a schematic diagram of a network topology 100 that supports cloud computing and that includes Access Switches that comprise Host Detection and Signaling Logic. As shown, a top level network 120 interconnects a plurality of routers 125. Some of these routers 125 may be Provider Edge routers that enable connectivity to Data Centers 131, 132 via Data Center (DC) Edge routers 133, 134, 135, 136. Other routers 125 may be employed exclusively internally to top level network 120 as "core" routers, in that they may not have direct visibility to any DC Edge router.

Each Data Center 131, 132 (and using Data Center 131 as an example) may comprise DC Edge routers 133, 134 (as mentioned), a firewall 138, and a load balancer 139. These elements operate together to enable "pods" 151(1)-151(n), 152(1), etc., which respectively include multiple cloud resource devices 190(1)-190(3), 190(4)-190(7), 190(8)-190(11), to communicate effectively through the network topology 100 and provide computing and storage services to, e.g., clients 110, which may be other Data Centers or even stand alone computers, as shown. One way to implement such a cloud computing environment is via a publish-subscribe system. In such a system, the cloud resource devices 190(1)-190(3), 190(4)-190(7), 190(8)-190(11) publish their services, capabilities, etc., and clients 110 make requests for those services or resources. That is, clients 110 become subscribers to the resources that are provided by the cloud resource devices 190. Significantly, the clients 110 themselves may have no knowledge of which specific cloud resource device(s) 190 actually provides the desired service (e.g., compute, storage, etc.). Also shown in Data Center 131 is a Management Node 195, the function of which is, generally, to control and/or configure, among other things, the firewall 138 and load balancer 139 to optimize operation of the Data Center 131 or to apply particular policies as appropriate.

Still referring to FIG. 1, each Data Center pod, e.g., 151(1), may comprise one or more aggregation nodes 160(1), 160(2), etc. that are in communication with the multiple cloud resource devices 190 via Access Switches 180(1), 180(2), as may be appropriate. Aggregation nodes 160 may be configured to aggregate the functionality of the cloud resource devices 190 such that DC Edge routers 133, 134, etc. need not keep track of the potentially thousands of individual machine that constitute the cloud resource devices 190. A firewall 178 and load balancer 179 may also be furnished for each pod 151 to ensure security and improve efficiency of connectivity with upper layers of network topology 100. That is, specific pod-based policies might be desired for selected pods, which policies can be applied via firewall 178. Likewise, load balancing among the Access Switches 180 and thus individual cloud resource devices 190 can be effected via load balancer 179. These latter two entities, firewall 178 and load balancer 179 can be configured the same for all pods or can be configured differently depending on the needs of the service provider or clients 110. A Management Node 197 may also be provided within each pod, and such a node may be configured, like Management Node 195 to control/configure the firewall 178 and load balancer 179 in its associated pod.

Cloud resource devices 190 themselves may be web or application servers, storage devices such as disk drives, or any other computing resource that might be of use or interest to an end user, such as client 110. In this regard, each of the cloud resource devices 190 may function as a "host" for one or more such applications. Thus, a host in the context of the instant disclosure may be considered to be a provisioned server or storage device (among other possible devices) that is configured with software to perform one or more tasks on behalf of an end user, such as client 110. Those skilled in the art will appreciate that the term "host" can be used to represent either a physical hardware device, or a virtual machine that that may operate on a physical device.

In some instances, a host can be provisioned manually, as follows. A server administrator builds a selected server and then connects that server to the network. In the case of FIG. 1, connection may be via an associated Access Switch 180. Thereafter, the server administrator might communicate the insertion of the server to a network administrator. The server administrator may likewise communicate the insertion of the server to a security administrator. When those steps (operations) are complete, the network administrator can provision the network for the server (e.g., configures Access Switch 180 to become aware of the server's presence) and the security administrator can provision appropriate security services for the server, e.g., by configuring firewall 178 with appropriate policies. After the forgoing operations are completed, the server is online and becomes available for use by clients 110.

Precisely how this physical server might thereafter be used, however, may become unknown to the network provider. That is, an end user may, for instance, instantiate a virtual machine on one of the provisioned servers, and that virtual machine may subsequently be migrated to yet another online, provisioned, server or host. Accordingly, an issue arises, from a network management perspective, as to how to monitor when a given host becomes connected or disconnected from the network and precisely where, logically and physically, the connection or disconnection has occurred.

In accordance with an embodiment, rather than manually determining when and where a given host becomes connected or disconnected from the network, a network node, e.g., an associated Access Switch 180, is configured to detect the insertion of a new node (i.e., a host including, possibly, a virtual machine) in the cloud computing network. Although the remainder of this description will assume that it is an Access Switch 180 that performs the detection of a new host (and other functions described herein), those skilled in the art will appreciate that other nodes may be employed to perform these functions, such as core/aggregation switch 160 or DC Edge Routers 133-136.

More specifically, the Access Switch 180 (although, again, the particular node could be a node other than an Access Switch) is configured to include Host Detection and Signaling Logic 230 whose functionality is described in detail below. In one possible embodiment, each of the Access Switches 180 includes an instance of Host Detection and Signaling Logic 230 so that a given Access Switch 180 can monitor the activities of hosts, i.e., the activities of respective cloud resource devices 190 to which the Access Switch is connected.

Figure 2A:
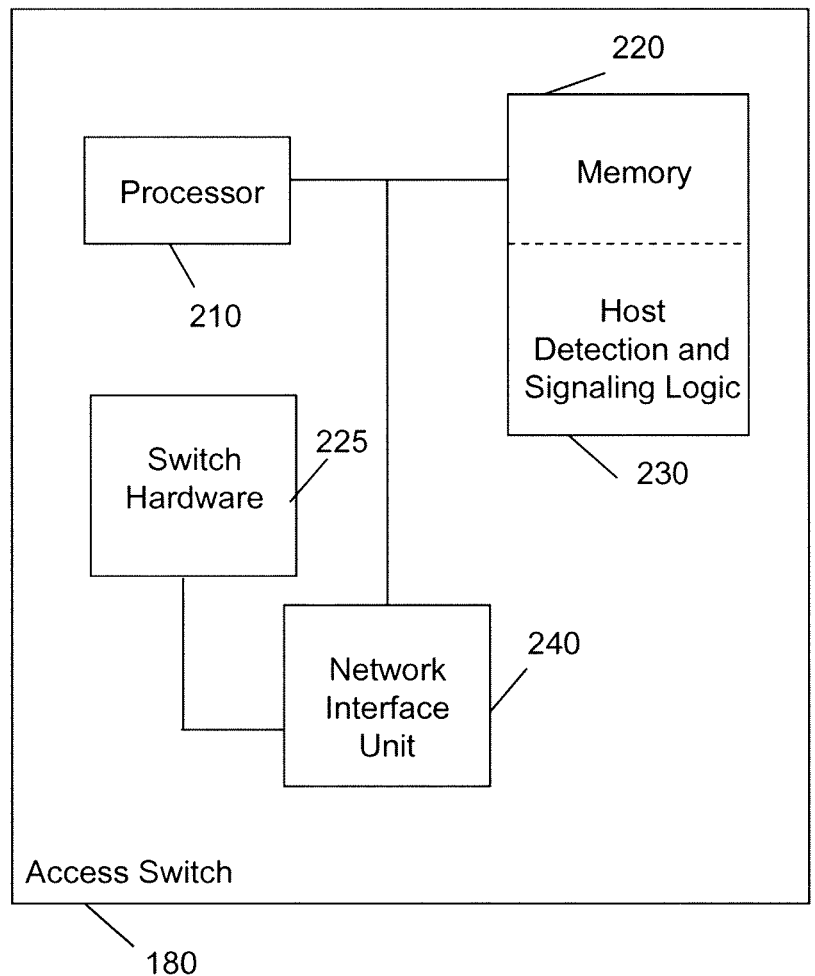
FIG. 2A depicts an example Access Switch including Host Detection and Signaling Logic.

FIG. 2A depicts an example Access Switch 180 including Host Detection and Signaling Logic 230. For example, Access Switch 180 may comprise a processor 210, associated memory 220, which may include Host Detection and Signaling Logic 230, and a network interface unit 240, such as a network interface card. Switch hardware 225 may also be included. Switch hardware 225 may comprise one or more application specific integrated circuits and supporting circuitry to buffer/queue incoming packets and route the packets over a particular port to a destination device. The switch hardware 225 may include its own processor that is configured to apply class of service, quality of service and other policies to the routing of packets. Access Switch 180 may be accessible directly or remotely via input/output functionality including functions supported by, e.g., a keyboard, mouse and display to enable direct control of the Access Switch 180.

Processor 210 may be a programmable processor (microprocessor or microcontroller) or a fixed-logic processor. In the case of a programmable processor, any associated memory (e.g., 220) may be of any type of tangible processor readable memory device (e.g., random access, read-only, etc.) that is encoded with or stores instructions that can implement the Host Detection and Signaling Logic 230. Alternatively, processors 210 may be comprised of a fixed-logic processing device, such as an application specific integrated circuit (ASIC) or digital signal processor that is configured with firmware comprised of instructions or logic that cause the processor to perform the functions described herein. Thus, Host Detection and Signaling Logic 230 may be encoded in one or more tangible computer readable storage media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in one or more processor- or computer-readable storage media that is encoded with instructions for execution by a processor that, when executed by the processor, are operable to cause the processor to perform the functions described herein.

Figure 2B:
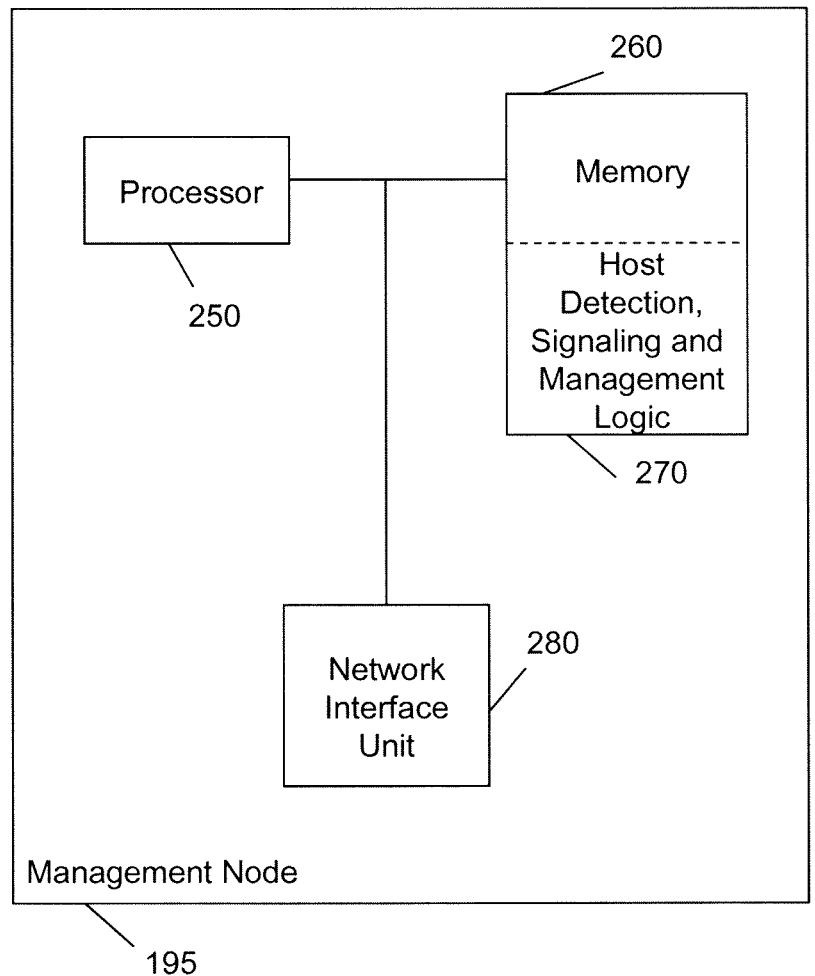
FIG. 2B depicts an example Management Node that is configured to receive host information from the Access Switch.

FIG. 2B depicts an example Management Node 195 that is configured to receive host information from the Access Switch. Management Node 197 may be configured in a similar fashion. As shown, Management Node 195 may include a processor 250, similar to processor 210, memory 260 and a network interface 280, also similar to those analogous components in Access Switch 180. Management Node 195 also includes Host Detection, Signaling and Management Logic 270. This logic 270, described more fully below, is configured to communicate with the Host Detection and Signaling Logic 230 and to further communicate and manage, at least, any firewalls and load balancers under its control.

To address the complexity and expansive nature of a cloud computing network like that shown in FIG. 1, embodiments described herein provide a signaling mechanism that informs the network when new hosts join the network. In one possible embodiment, not only is the newly connected host detected, but other parameters associated with the new node or host are captured. Such parameters may include, e.g., a media access controller (MAC) address, virtual MAC address Internet Protocol (IP) address, VLAN identifier (ID) or interface via which the node or host connects. In dynamic environments, not all of these properties will necessarily be known when the (new) host first joins the network, especially in the case where a virtual machine might be migrated from one physical device to another. In accordance with one possible implementation, one way to learn about a newly-connected host without directly communicating with that host for that purpose, is to actively snoop on packets that traverse, e.g., Access Switch 180. As noted, cloud resource devices 190 are employed by clients 110. As such, there will ultimately be exchanges of data between a given client 110 and a given cloud resource device 190 or host that is performing tasks on behalf of client 110. In a packet switched network like a cloud computing network that is often operable via the Internet, data in the form of discrete packets is passed between the client 110 and cloud resource device or host 190. These packets can be investigated and monitored to determine whether a new host has come on line, as well as to obtain selected measurements about the host, as will be explained further below.

As mentioned earlier, cloud computing networks may implement publish-subscribe busses or channels. These busses or channels can be in-band or out-of-band. In accordance with one possible implementation, a publish-subscribe bus can be exploited to carry information associated with a given host that is gleaned from packet snooping. The information can be consumed by the cloud computing network or by proprietary applications operating within the cloud to monitor the behavior of the several hosts that are operating within a given logical space. In the specific embodiment described herein, this information is consumed by one or more Management Nodes 195, 197.

As a high-level example, once a host is provisioned, information about the host can be consumed by, e.g., a Management Node 195, 197 to verify that the provisioning was as expected. The gathering of information in this manner can also be used as a trigger point to initiate further actions. For example, firewalls and load balancers can be adjusted according to any newly detected host as well as in accordance with any policy that might be applicable.

Thus, again, the methodology and apparatus described herein enable the automatic discovery of a new host that is added to a network. This automatic discovery is accomplished not by communicating directly with the host, but instead by performing packet snooping or sniffing as the host exchanges data with another entity. The snooped packets may include a rich set of information that can help to identify and characterize the newly-connected host. For example, packet snooping can result in the automatic discovery of the addressing properties of a host.

In one possible implementation, and as shown in FIG. 2A, Host Detection and Signaling Logic 230 is configured to operate on Access Switch 180. With reference to FIG. 1 as well, Access Switch 180 may be considered a first hop network switch relative to a cloud resource device 190. Thus, because of the proximity of Access Switch 180 to a host (cloud resource device 190), Access Switch 180 may be a particularly suitable location to instantiate the Host Detection and Signaling Logic 230. In accordance with an embodiment, Host Detection and Signaling Logic 230 is configured to apply one or more packet snooping methodologies to the packets that flow through the Access Switch via, e.g., its network interface 240. More particularly, Host Detection and Signaling Logic 230 can be configured to trap Address Resolution Protocol (ARP)/Gratuitous-ARP messages and, thus, automatically learn the address of the host from the trapped message. ARP messages may also be used to, e.g., determine a given host's media access controller (MAC) address knowing only its current IP address.

Similarly, in Data Centers where Dynamic Host Configuration Protocol (DHCP) is used, DHCP snooping can be employed by Host Detection and Signaling Logic 230 to learn, e.g., the address of the host. Other snooping methodologies can also be leveraged, such as Label Distribution Protocol (LDP), to gather host details in environments where that is feasible. Moreover, besides learning the address of the host, it is also possible to determine the specific physical port/interface via which the host is connected to the Access Switch. Those skilled in the art will appreciate that any methodology by which packets passing through Access Switch 180 can be examined (snooped) can be employed in connection with the methodologies described herein.

Furthermore, packet snooping can also be employed to monitor packets on a virtual local area network (VLAN) or port basis. As such, it is possible to monitor data on a per port, set of ports or VLAN basis. With such multiple monitoring capabilities it is thus possible to avoid extraneous or duplicate detections of a new host joining the network. In conditions where duplicates occur, such duplicates can be reconciled such that only one event (e.g., "new host detected") can be generated and sent to the node consuming the information, e.g., Management Node 195. As mentioned, the information itself can be exposed through a publish-subscribe system that uses, e.g., eXtensible Markup Presence Protocol (XMPP), to exchange messages. Alternatively, the information can be exposed through a separate Application Programming Interface (API) configured to allow a node to request and obtain the information from the Host Detection and Signaling Logic 230 operating on Access Switch 180. This exposing of the information gleaned about the host is characterized by the signaling portion of the Host Detection and Signaling Logic 230 and the Host Detection, Signaling and Management Logic 270.

Also, in platforms where advanced capabilities are available and desired, per host usage measurements can be published (or accessed via an API) at regular intervals. Such usage measurements may include, but need not be limited to, the number of bytes/packets sent by the host, the number of bytes/packets received by the host, the total number of bytes/packets sent and received by the host, and how many different nodes the host is communicating with. Other usage measurements might be indicative of services operating on a given host connected to a given port. These measurements could be used for traffic analysis, performance monitoring and trouble shooting.

Figure 3A:
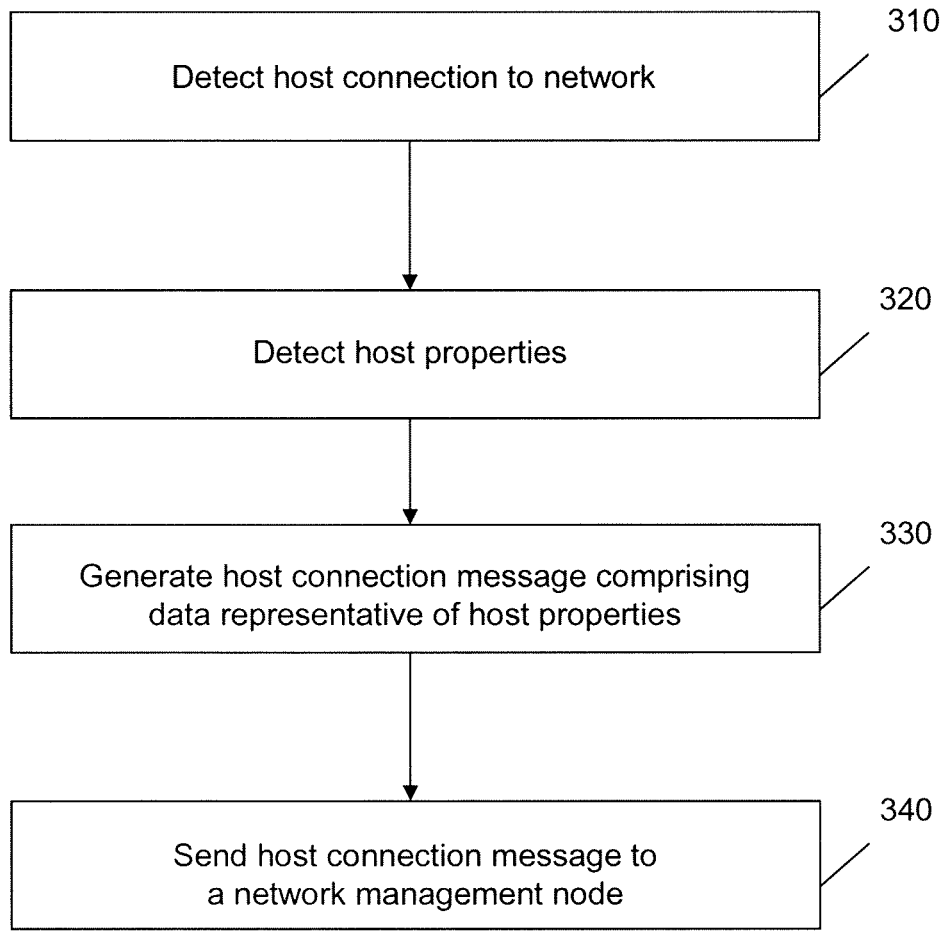
FIG. 3A is a flow chart depicting an example series of operations for detecting that a host has connected to a network.

Reference is now made to FIG. 3A, which shows a flow chart depicting an example series of steps (operations) for performing host detection and signaling in accordance with one possible implementation. That is, the steps (operations) shown in FIGS. 3A and 3B, as well as those shown in FIGS. 4A, 4B, 5A and 5B, may be performed by Host Detection and Signaling Logic 230 operating in conjunction with Access Switch 180.

At step 310, a new host connecting to the network is detected. Detection can be performed by packet snooping and determining, e.g., that packets containing a new MAC or IP address are flowing in the network. A new MAC or IP address is indicative of a new host being connected. At step 320, properties of the host can likewise be detected. That is, using still further packet snooping methods, an IP address, port number (e.g., related to Transmission Control Protocol/User Datagram Protocol (TCP/UDP)), and VLAN tag associated with a data session being supported by the host can all be obtained and associated with the new host. The physical port of the Access Switch can also be determined.

At step 330, the properties of the host can be packaged into a host connection message and made available for publication via, e.g., an XMPP-based publish-subscribe mechanism. Management Nodes 195, 197 can operate an appropriate XMPP client and thus obtain the published host connection message. Alternatively, the host properties information can be made available via an API such that management nodes 195, 197 can gain access to the information at predetermined intervals, or upon request. Ultimately, and as shown at step 340, the generated host connection message is sent to another node in the network, such as Management Node 195, 197, where the information can be aggregated with other information about hosts being serviced by other Access Switches 180. Those skilled in the art should appreciate that the host connection message need not necessarily be passed to another node, but may instead be processed directly in the Access Switch or other node in which the Host Detection and Signaling Logic 230 is instantiated.

Figure 3B:
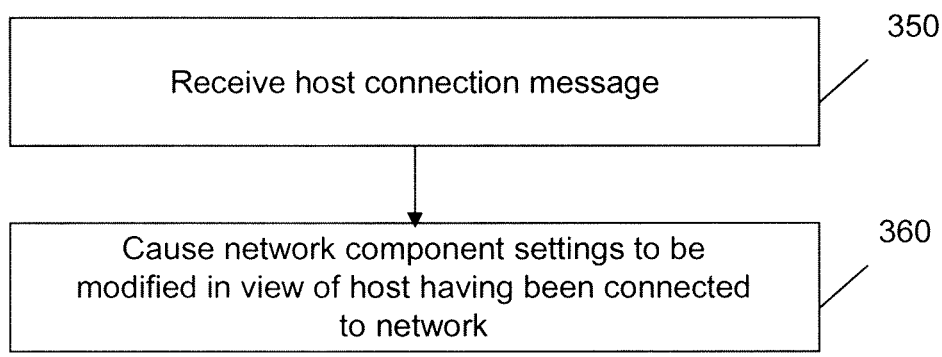
FIG. 3B is a flow chart depicting an example series of operations that may be performed by a Management Node in connection with receiving a host connection message.

FIG. 3B is a flow chart depicting an example series of steps that may be performed by Management Node 195 or 197 upon receipt of a host connection message as sent by Host Detection and Signaling Logic 230. At step 350, a host connection message is received that is indicative that a new host has connected to the network. At step 360, the Management Node 195 or 197, in response to the host having been connected to the network, causes network component settings to be modified. For example, with the connection of a new host, Management Node 195 may be configured to modify the settings of a firewall or load balancer under its control. For instance, if the newly-connected host places a given Access Switch under undue stress, an associated load balancer, controlled by Management Node 195, may be configured to cause another Access Switch to be brought online, among other possible actions. These actions may be initiated by Host Detection, Signaling and Management Logic 270.

Figure 4A:
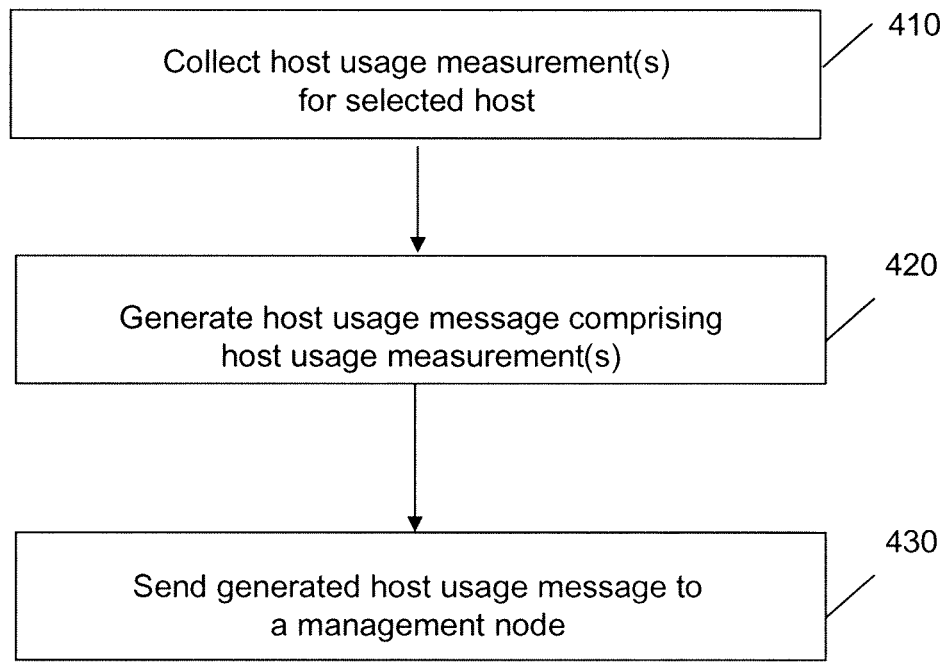
FIG. 4A is a flow chart depicting an example series of operations for monitoring a host and collecting usage measurements relating thereto.

FIG. 4A is a flow chart depicting an example series of steps for monitoring a host and collecting usage measurements relating thereto. More specifically, at step 410 usage measurements may be collected for a selected or given host by continued packet snooping. Usage measurements may include metrics such as byte counts, among other measurements, as mentioned above. Periodically, and as indicated by step 420, a host usage message is generated comprising the usage measurements (or subset or summary thereof) that have been collected. The host usage message may be automatically generated at predetermined intervals (e.g., every 30 minutes, 1 hour, 12 hours, 24 hours, etc.), or may be generated as a result of one or more metrics exceeding a predetermined threshold. For example, a host usage message may be generated when the number of bytes sent by the host exceeds a predetermined value. Other triggers may be implemented in a similar fashion.

At step 430 the generated host usage message is forwarded to another node such as Management Node 195 or 197.

Figure 4B:
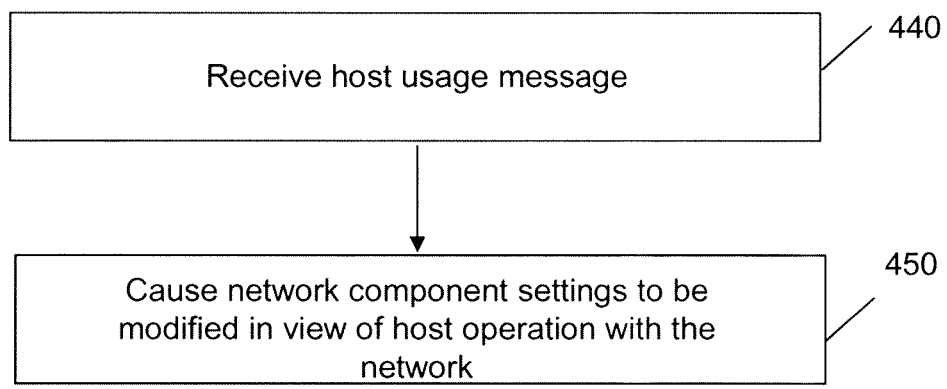
FIG. 4B is a flow chart depicting an example series of operations that may be performed by a Management Node in connection with receiving a host usage message.

FIG. 4B is a flow chart depicting an example series of steps that may be performed by, e.g., Management Node 195 or 197 in conjunction with Host Detection, Signaling and Management Logic 270 upon receipt of a host usage message as sent or initiated by Host Detection and Signaling Logic 230. At step 440, a host usage message is received that is indicative of the operation of the host that is being monitored. At step 450, the management node, in response to the host usage data or information, causes network component settings to be modified. As before, the Management Node 195 or 197 may be configured to modify the settings of a firewall or load balancer under its control to compensate for the increased or decreased use of the host being monitored.

Figure 5A:
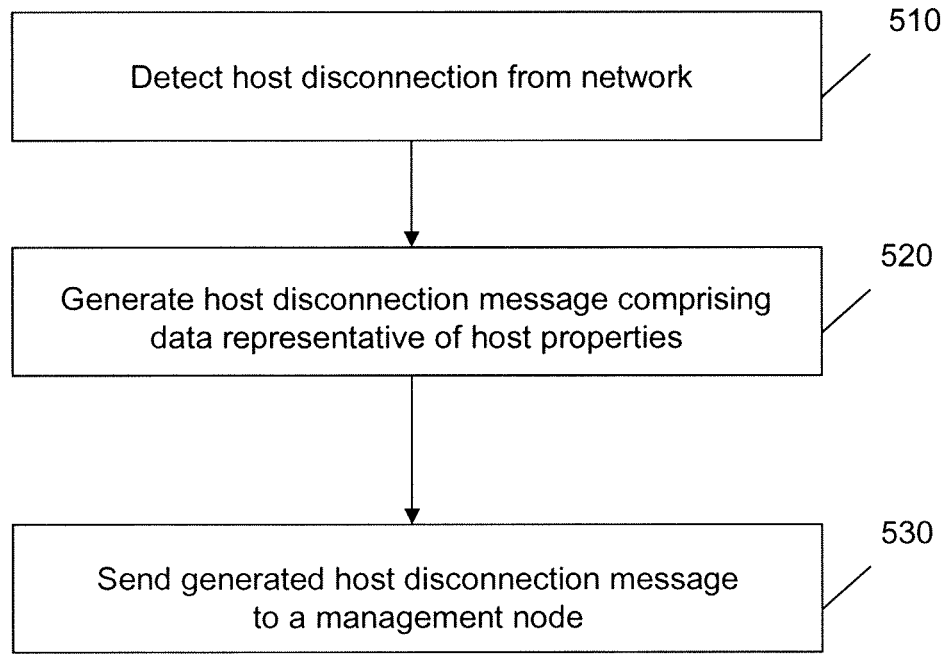
FIG. 5A is a flow chart depicting an example series of operations for detecting that a host has been disconnected from a network.

FIG. 5A is a flow chart depicting an example series of steps for detecting that a host has been disconnected from a network. As step 510, via packet snooping, it is determined that a host has disconnected from the network. Such a determination can be made by the absence of packets being passed through Access Switch 180 having the IP address or MAC address of the host. For example, the Host Detection and Signaling Logic 230 may be configured to deem that a selected host is no longer connected when packets previously flowing to and from the host are no longer detected. Alternatively, the Host Detection and Signaling Logic 230 may snoop into a set of packets that are indicative of the host being taken offline, or moved to a different machine (if, e.g., the host is a virtual machine that is being migrated).

At step 520, a host disconnection message can be generated. Such a message will comprise data representative of host properties such as IP address, or MAC address, among others, so that the recipient of the host disconnection message will know which host has been disconnected from the network. At step 530 the generated host disconnection message is sent to, e.g., Management Node 195 or 197.

Figure 5B:
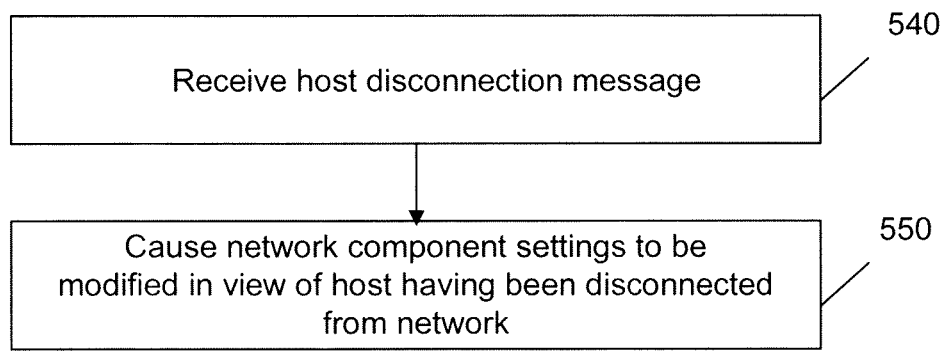
FIG. 5B is a flow chart depicting an example series of operations that may be performed by a Management Node in connection with receiving a host disconnection message.

FIG. 5B shows an example series of steps that may be performed by, e.g., Management Node 195 or 197 in conjunction with Host Detection, Signaling and Management Logic 270 upon receipt of a host disconnection message as sent or initiated by Host Detection and Signaling Logic 230. At step 540, a host disconnection message is received that is indicative that a host has disconnected from the network. At step 550, the Management Node 195 or 197, in response to the host having been disconnected to the network, causes network component settings to be modified. For example, with the disconnection of a host, Management Node 195 may be configured to modify the settings of a firewall or load balancer under its control to compensate for the disconnection of the newly-disconnected host.

Figure 6:
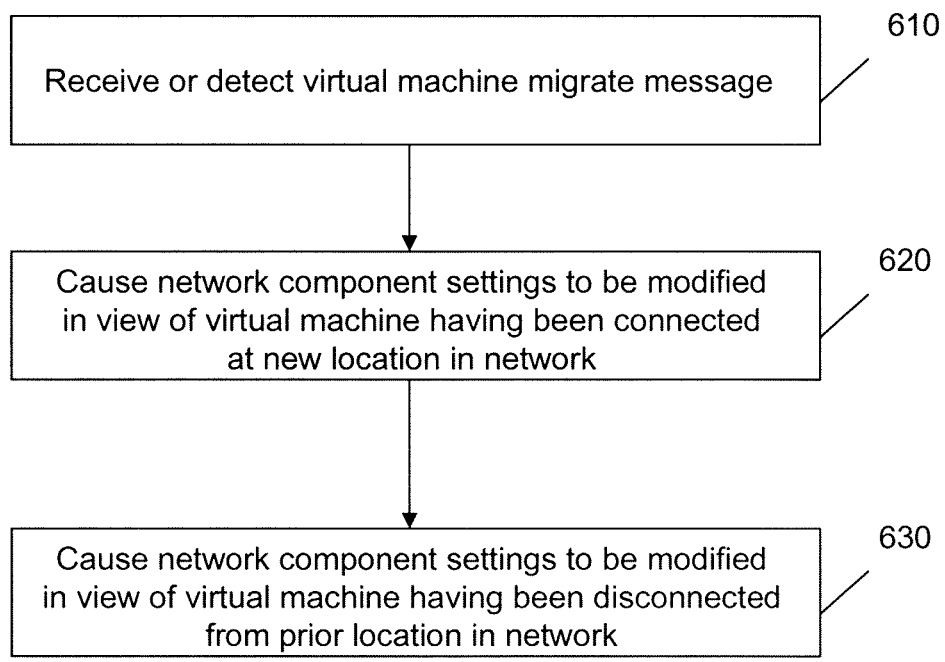
FIG. 6 is a flow chart depicting an example series of operations that may be performed by a Management Node in connection with a virtual machine being moved from one physical location to another.

FIG. 6 shows an example series of steps that may be performed by, e.g., Management Node 195 or 197 in conjunction with Host Detection, Signaling and Management Logic 270 upon notification that a virtual machine or host is to be migrated from one physical location in the network to another physical location. As shown, at step 610, a virtual machine migrate message is detected or received. The message may be received directly by an Access Switch 180 and passed to Management Node 195 or 197, or may be detected by Access Switch 180, as explained herein, and then passed to Management Node 195 or 197. Thereafter, to accommodate the movement of the virtual machine from one location to another, at step 620, the, e.g., appropriate Management Node 195 or 197 causes network component settings to be modified in view of the virtual machine having been connected at a new physical location. Then, or perhaps substantially simultaneously, at step 630, the Management Node 195 or 197 having control over the "old" location of the virtual machine causes network component settings to be modified in view of the virtual machine having been disconnected from the prior or old location in the network. In this way, as virtual machines are migrated around the cloud computing network, network components can react dynamically in order to optimize use of available network resources.

Thus, as explained herein, the described methodologies and apparatus are configured to automatically determine when a host connects to a network, such as a cloud computing network. Automation is made possible by packet snooping mechanisms that are implemented close to where the host connects, such as an Access Switch. The packet snooping enables the methodology to capture the host's IP address, MAC address, and port number, etc., which information can then be published or otherwise made available to a network management entity, such a Management Node. The management entity can then make suitable adjustments to network components in light of the newly-connected host. Periodic measures of host usage can also be published, or otherwise made available, such that the management node can still further adjust network component as may be need to accommodate the host. Ultimately, it may also be detected when the host becomes disconnected from the network such that the management node can make appropriate adjustments in light of the disconnection.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
    detecting, at a data switching device in a data center, whether a host has connected to a cloud computing network of which the data switching device and the data center are components, wherein the detecting is performed by monitoring data packets that are sent to another entity from the host and that are received by the host from the another entity and that pass through the data switching device, wherein the another entity is other than the data switching device;
    determining, at the data switching device, properties of the host;
    generating, at the data switching device, a message comprising data representative of the properties of the host; and
    sending, from the data switching device, the message to a node in the cloud computing network that is configured to manage components of the cloud computing network associated with the host, wherein the components are other than the data switching device and the host.

2. The method of claim 1, wherein monitoring data packets comprises snooping packets associated with one of Link Layer Discovery Protocol (LLDP), Dynamic Host Configuration Protocol (DHCP), or Address Resolution Protocol (ARP).

3. The method of claim 1, wherein determining, at the data switching device, properties of the host comprises determining at least one of Internet Protocol (IP) address of the host, a port number over which the host is communicating, a physical port number, a media access control (MAC) address, a virtual MAC address, or a virtual Local Area Network (VLAN) tag associated with a data session being supported by the host.

4. The method of claim 1, wherein generating, at the data switching device, a message comprising data representative of the properties of the host comprises generating a message consistent with the eXtensible Messaging and Presence Protocol (XMPP).

5. The method of claim 1, further comprising periodically publishing, from the data switching device, usage measurements for the host.

6. The method of claim 1, further comprising detecting, at the data switching device, that the host has disconnected from the cloud computing network.

7. The method of claim 1, wherein detecting, at the data switching device, whether a host has connected to the cloud computing network comprises reconciling detection results from each of multiple alternative host connection detection methods to obtain a single indication that the host has connected to the cloud computing network.

8. The method of claim 1, wherein the components at least one of a firewall or a load balancer.

9. An apparatus, comprising:
    a processor;
    a memory in communication with the processor; and
    a network interface unit in communication with the processor and memory,
    wherein the processor is configured, along with logic instructions stored in the memory, to:
    detect whether a host has connected to a cloud computing network wherein the detecting is performed by monitoring data packets that are sent to another entity from the host and that are received by the host from the another entity and that pass through the, apparatus, wherein the another entity is other than the apparatus;
    determine properties of the host;
    generate a message comprising data representative of the properties of the host;
    and
    send, via the network interface unit, the message to a node in the cloud computing network that is configured to manage components of the cloud computing network associated with the host, wherein the components are other than the apparatus and the host.

10. The apparatus of claim 9, wherein the processor is further configured to monitor data packets by snooping packets associated with one of Link Layer Discovery Protocol (LLDP), Dynamic Host Configuration Protocol (DHCP), or Address Resolution Protocol (ARP).

11. The apparatus of claim 9, wherein the processor is further configured to determine properties of the host by determining at least one of Internet Protocol (IP) address of the host, a port number over which the host is communicating, a physical port number, a media access control (MAC) address, a virtual MAC address, or a virtual Local Area Network (VLAN) tag associated with a data session being supported by the host.

12. The apparatus of claim 9, wherein the processor is further configured to generate a message comprising data representative of the properties of the host by generating a message consistent with the eXtensible Messaging and Presence Protocol (XMPP).

13. The apparatus of claim 9, wherein the processor is further configured to periodically publish usage measurements for the host.

14. The apparatus of claim 9, wherein the processor is further configured to detect that the host has disconnected from the cloud computing network.

15. The apparatus of claim 9, wherein the processor is further configured to detect whether a host has connected to the cloud computing network by reconciling detection results from each of multiple alternative host connection detection methods to obtain a single indication that the host has connected to the cloud computing network.

16. The apparatus of claim 9, wherein the components comprise at least one of a firewall or a load balancer.

17. A computer-readable memory medium storing instructions that, when executed by a processor, cause the processor to:
    detect whether a host has connected to a cloud computing network by monitoring data packets that are sent to another entity from the host and that are received by the host from the another entity and that pass through a data switching device, wherein the another entity is other than the data switching device;
    determine properties of the host;
    generate a message comprising data representative of the properties of the host; and
    send the message to a node in the cloud computing network that is configured to manage components of the cloud computing network associated with the host, wherein the components are other than the data switching device and the host.

18. The computer-readable memory medium of claim 17, wherein the instructions that cause the processor to monitor data packets comprise instructions that cause the processor to snoop on packets associated with one of Link Layer Discovery Protocol (LLDP), Dynamic Host Configuration Protocol (DHCP), or Address Resolution Protocol (ARP).

19. The computer-readable memory medium of claim 17, wherein the instructions cause the processor to detect that the host has disconnected from the cloud computing network.

20. The computer-readable memory medium of claim 17, wherein the components comprise at least one of a firewall or a load balancer.

* * * * *